Feb. 15, 1944.　　　D. ROBERTS　　　2,341,947
CHUCK
Filed May 15, 1941
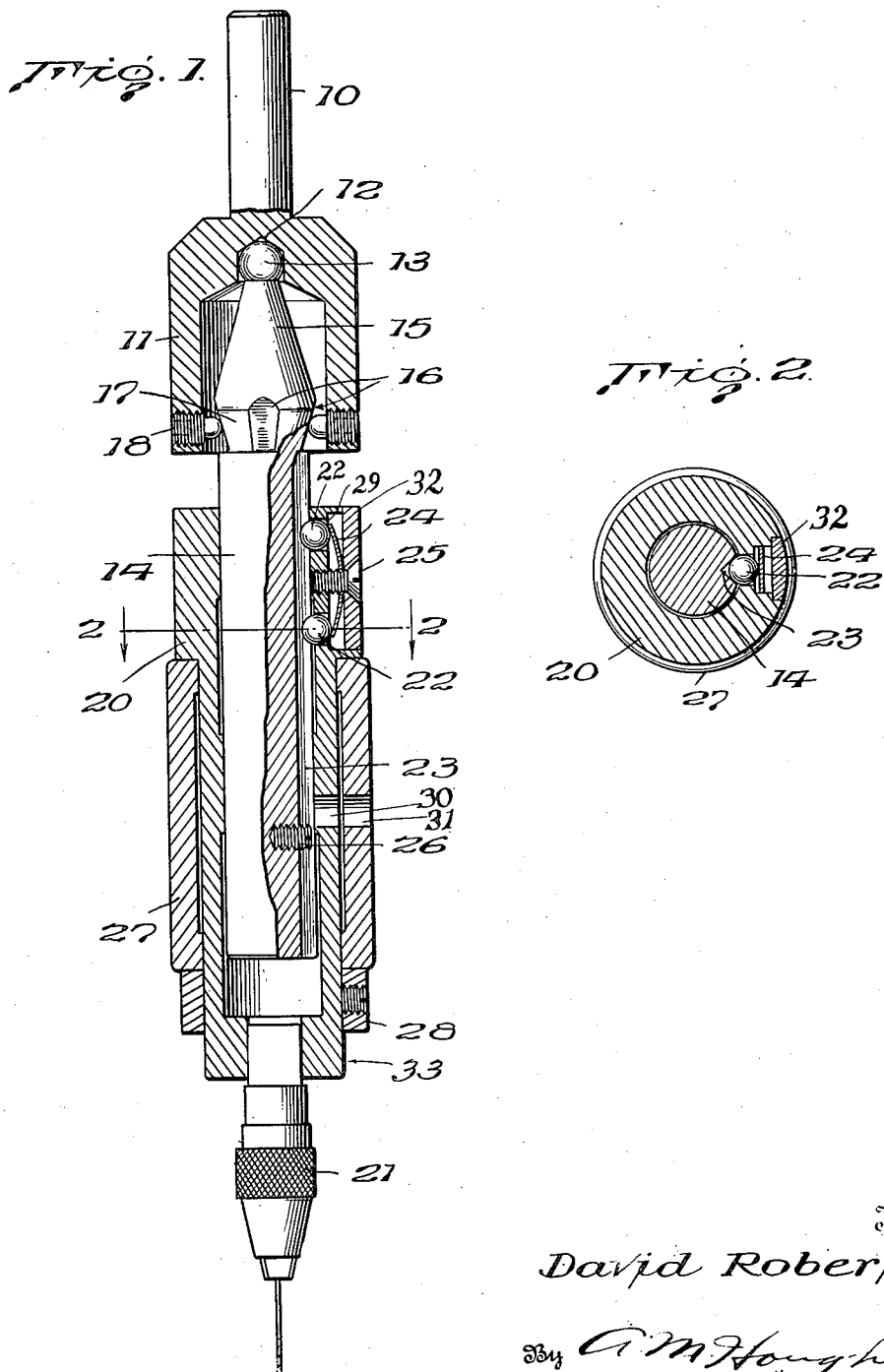
Inventor
David Roberts
By G. M. Houghton
his Attorney Patented Feb. 15, 1944

2,341,947

UNITED STATES PATENT OFFICE 2,341,947

CHUCK

David Roberts, Wilkinsburg, Pa.

Application May 15, 1941, Serial No. 393,619

9 Claims. (Cl. 77—31)

This invention relates to chucks; and it comprises, in a chuck for holding and rotating a tool while allowing axial movement of the tool, a stem adapted to be rotated by a motor or the like, a spindle, means for attaching the spindle to the stem constructed and arranged to provide a centering adjustment of the spindle with respect to the stem, a chuck member in guided axial sliding relation to the spindle, means for preventing angular displacement of the chuck member with respect to the spindle, and a manual operating sleeve in fixed axial relation to the chuck member but free to rotate thereon; all as more fully hereinafter set forth and as claimed.

In machine shop work it is sometimes desired to make use of drill presses with drills smaller than are intended for the press. This can be done after a fashion by inserting in the regular chuck a smaller chuck; but it is often found in such case that the drill press feed is too coarse for the small drill, and moreover it is difficult, in such expedient, to secure the required accurate centering of the small drill.

The main object of the invention is the provision of a chuck assembly for insertion in the regular chuck of a press, which assembly is adapted for manual feed, independent of the feed of the drill press, and as delicate or sensitive as may be desired; and which moreover can be readily adjusted to center the small drill.

The object is achieved by the provision of a chuck assembly including a stem or shank adapted to be gripped in a large drill press chuck, and carrying a spindle, in freely adjustable relation to the stem, through the agency of a modified ball-and-socket joint. The spindle in turn carries a sliding sleeve, guided so as to rotate with the spindle; this sleeve being fitted with a small chuck. A manually operable sleeve is mounted on this chuck sleeve in rotatable relation, for feeding the drill or other tool carried by the small chuck.

In the accompanying drawing is shown, more or less diagrammatically, an example of a specific embodiment of apparatus within the purview of the invention. In the drawing Fig. 1 is a view of the chuck assembly in central vertical section with some parts in elevation, and Fig. 2 is a sectional view taken along line 2—2 of Fig. 1.

In the drawing the chuck assembly is shown as comprising a stem or shank 10, terminating in a cup 11 having a conical socket 12 adapted to receive the ball end 13 of a spindle 14, having a conical upper portion 15 terminating in the ball as shown and a reentrant conical portion 17 with tapered flats at 16. A plurality of ball-end set screws 18, conveniently four in number, are provided around the periphery of the cup, engaging the flats as shown. This arrangement constitutes an effective centering means for the spindle. Because of the relatively great length of the spindle, as compared to that of small drills, a slight angularity between the axis of the chuck and that of the spindle does not produce any noticeable wabble of the drill but it does effectively take care of eccentricity. By virtue of the ball-and-socket joint 12, 13 and the taper of flats 17, when the adjusting screws are tightened the spindle is solidly held in relation to the stem. There is no rattle or looseness.

Surrounding the spindle, in close sliding fit, is a sleeve 20, carrying at its lower end a small chuck 21 and rotatable by the spindle through the agency of a pair of balls 22 fitted movably in a pair of bores 29 in the wall of the sleeve and engaging a triangular groove 23 in the spindle (Fig. 2). The balls are pressed therein by a leaf spring 24 retained to the sleeve by a plate 32 and a screw 25, as shown, advantageously under sufficient pressure to keep the spindle from falling of its own weight when in the normal vertical position shown. A stop 26, removable for disassembly purposes through bores 30 and 31, limits the downward movement of the sleeve 20. A hand sleeve 27, conveniently of Bakelite, surrounds sleeve 20 in freely rotatable relation and is retained by a ring 28 as shown.

In use, assuming shank 10 to be gripped in the chuck of a drill press (not shown) and a small drill to be fitted in chuck 21, the drill is fed under the desired load by pulling down on sleeve 27. If centering is required this is readily accomplished with the aid of screws 18. Surface 33 of sleeve 20 is concentric with the chuck and can be used for truing up the chuck by bringing to the surface a suitable indicator which will detect any eccentricity during rotation.

The sleeve assemblage is shown in the figure pulled down a small distance from its normal upper position.

What I claim is:

1. A fine-feed chuck unit comprising a stem adapted to be rotated, a spindle, a detachable coupling for holding the spindle in fixed relation to the stem and centered with respect to the same, a chuck member in guided axial sliding relation to the spindle, means for preventing angular displacement of the chuck member with respect to the spindle, and a manually-operable feed member in rotatable relation to the chuck member.

2. A fine-feed chuck unit comprising a stem adapted to be rotated, a spindle terminating at a point adjacent an end of the stem and supported at that point against lateral displacement, adjustable means engaging the spindle at a zone spaced from said point, for retaining the spindle axis at a desired angular relation to the stem axis, and a chuck member in axially slidable driven relation to the spindle.

3. A fine-feed chuck unit comprising a stem adapted to be rotated, a spindle, a detachable coupling for attaching the spindle to the stem and providing a centering adjustment of the spindle with respect to the stem, a sleeve member provided with a chuck and mounted on the spindle in guided telescopic relation to the spindle, means for preventing angular displacement of the sleeve with respect to the spindle, and a manually-operable feed sleeve in rotatable relation to the chuck member.

4. A fine-feed chuck unit comprising a stem adapted to be rotated, and provided with an axial socket at one end thereof, a ball-end spindle terminating in the socket and supported thereby against lateral displacement, radially-adjustable means engaging the spindle at a zone spaced from said point, for retaining the spindle axis at a desired angular relation to the stem axis, and a chuck member in axially slidable driven relation to the spindle.

5. In a chuck a stem adapted to be rotated and provided with an axial socket at one end thereof, a ball-end spindle terminating in the socket and supported thereby against lateral displacement, said spindle having a plurality of flats, inclined with respect to its axis of rotation, at a zone spaced from the ball end, and radially adjustable means carried in fixed relation to the spindle and engaging said flats, for adjusting the spindle axis with respect to the stem axis.

6. A chuck comprising a stem adapted to be rotated, an elongated spindle movable about a center on the axis of the stem, a chuck member carried on the end of the spindle remote from said center, and radially movable adjusting means in fixed relation to the stem and operating on a portion of the spindle axially spaced from said center, for adjusting the inclination of the spindle axis with respect to the stem axis and thereby centering the chuck.

7. A fine feed chuck unit for drill presses comprising a stem adapted to be gripped and rotated by the drill press chuck and formed at one end with a socket having a step bearing in its base, a spindle seated at its end in said step bearing, securing means carried by said stem and extending into said socket for engagement with a cam surface on said spindle thereby to urge the same into the step bearing in desired angular relation to the socket, a sleeve surrounding the projecting end of said spindle and coupled thereto by an interposed ball detent carried by one of the members and extending into a longitudinal groove formed in the other member whereby the sleeve may be adjusted longitudinally of the spindle and rotated thereby in any adjusted position, a chuck carried by said sleeve, and means for manually advancing and retracting the said sleeve and chuck carried thereby.

8. A fine feed chuck unit for drill presses comprising a stem adapted to be gripped and rotated by the drill press chuck and formed at one end with a socket having a step bearing in its base, a ball-end spindle received in said socket and seated in said step bearing, radially adjustable means extending into said socket for engaging said spindle at a zone spaced from the ball end thereof, said spindle being formed with a plurality of diverging flats with which said adjustable means contact to effect a camming action urging the ball-end of said spindle into the step bearing of said socket, a sleeve member provided with a chuck and mounted on the spindle, means for preventing relative angular movement between the sleeve and spindle but permitting longitudinal movement of the sleeve, and means for moving the sleeve longitudinally to advance and retract the chuck of said unit independently of the drill press chuck.

9. A fine feed chuck unit for drill presses comprising a stem adapted to be gripped and rotated by the drill press chuck and formed at one end with a socket having a step bearing in its base, a ball-end spindle received in said socket and seated in said step bearing, radially adjustable securing means extending into the socket for engagement with inwardly diverging flats formed on said spindle at a zone spaced from the ball end thereof, whereby to urge the spindle into the step bearing in desired angular adjustment, a sleeve surrounding the projecting end of said spindle and mounting a chuck, a ball detent carried by said sleeve and extending into a longitudinal groove formed in said spindle whereby to prevent relative angular movement between said sleeve and spindle while permitting the sleeve to be adjusted longitudinally to advance and retract the chuck carried thereby, and stop means for limiting the longitudinal movement of said sleeve on said spindle.

DAVID ROBERTS.